(12) United States Patent
Estipona

(10) Patent No.: US 6,636,245 B1
(45) Date of Patent: Oct. 21, 2003

(54) METHOD AND APPARATUS TO DISPLAY VIDEO

(75) Inventor: Jim B. Estipona, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 09/594,325

(22) Filed: Jun. 14, 2000

(51) Int. Cl.⁷ .................................................. G09G 5/00
(52) U.S. Cl. ..................... 345/790; 345/781; 345/716; 345/719; 345/764
(58) Field of Search ................................. 345/797, 613, 345/682, 656, 716, 719, 730, 764, 802, 790, 791, 781

(56) References Cited

U.S. PATENT DOCUMENTS

| | | | | |
|---|---|---|---|---|
| 5,572,649 A | * | 11/1996 | Elliott et al. | 345/788 |
| 5,621,904 A | * | 4/1997 | Elliott et al. | 345/798 |
| 5,651,107 A | * | 7/1997 | Frank et al. | 345/768 |
| 5,675,755 A | * | 10/1997 | Trueblood | 345/791 |
| 5,760,772 A | * | 6/1998 | Austin | 345/798 |
| 5,825,360 A | * | 10/1998 | Odam et al. | 345/807 |
| 5,880,725 A | * | 3/1999 | Southgate | 345/790 |
| 6,025,841 A | * | 2/2000 | Finkelstein et al. | 345/803 |

* cited by examiner

Primary Examiner—John Cabeca
Assistant Examiner—Cuong T. Thai
(74) Attorney, Agent, or Firm—Steven D. Yates

(57) ABSTRACT

A method includes creating a first window to receive video which at least partially overlaps a second window on a region of overlap of a display. When the video is to be displayed in the background, the second window is configured to draw after the first window, and the first and second windows are configured as children of a common parent window. Otherwise, the first window is configured as a child of the second window.

15 Claims, 6 Drawing Sheets

METHOD AND APPARATUS TO DISPLAY VIDEO

BACKGROUND

1. Field

The present invention relates to the display of video in a computer system.

2. Background Information

Digital video comprises a sequence of digital images. It is increasingly common to display (e.g. render) digital video in computer systems. A computer system is any device comprising a processor and a memory to store instructions and data to be supplied to the processor. Typically, the processor and memory are coupled by way of one or more buses. A collection of instructions e.g. software, may be executed to convert the bits of the digital video to signals to a display device, e.g. to render the video. Examples of display devices are monitors and flat screens, to name just a few. Many other types of display devices are well known in the art.

Software may generate a windowed interface on the display device. The windowed interface may include windows with elements such as borders, title bars, buttons, sliders, and icons, to name just a few of the possibilities. Versions of the Microsoft™ Windows™ operating system, a product of Microsoft corporation, are examples of programs which produce windowed interfaces. Window elements are typically displayed on the "foreground" of a window; areas of the window in which display elements are not present are referred to as the "background" of the window. Rendering video on windowed interfaces is complicated by the need to coordinate the rendering of the video with the position and operation of windows and elements of the windows.

Existing techniques for rendering video on computer system displays may obscure or interfere with the operation of elements of the windowed interface. There is a continuing need for a manner of rendering video in the "background" of a window so that it does not interfere with the display or operation of windows, while at the same time coexisting with manners of displaying "foreground" video, e.g. video which does not have other display elements visible over top of it.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

The subject matter regarded as the invention is particularly pointed out and distinctly claimed in the concluding portion of the specification. The invention, however, may be further understood by reference to the following detailed description read with reference to the accompanying drawings.

Figure 1:
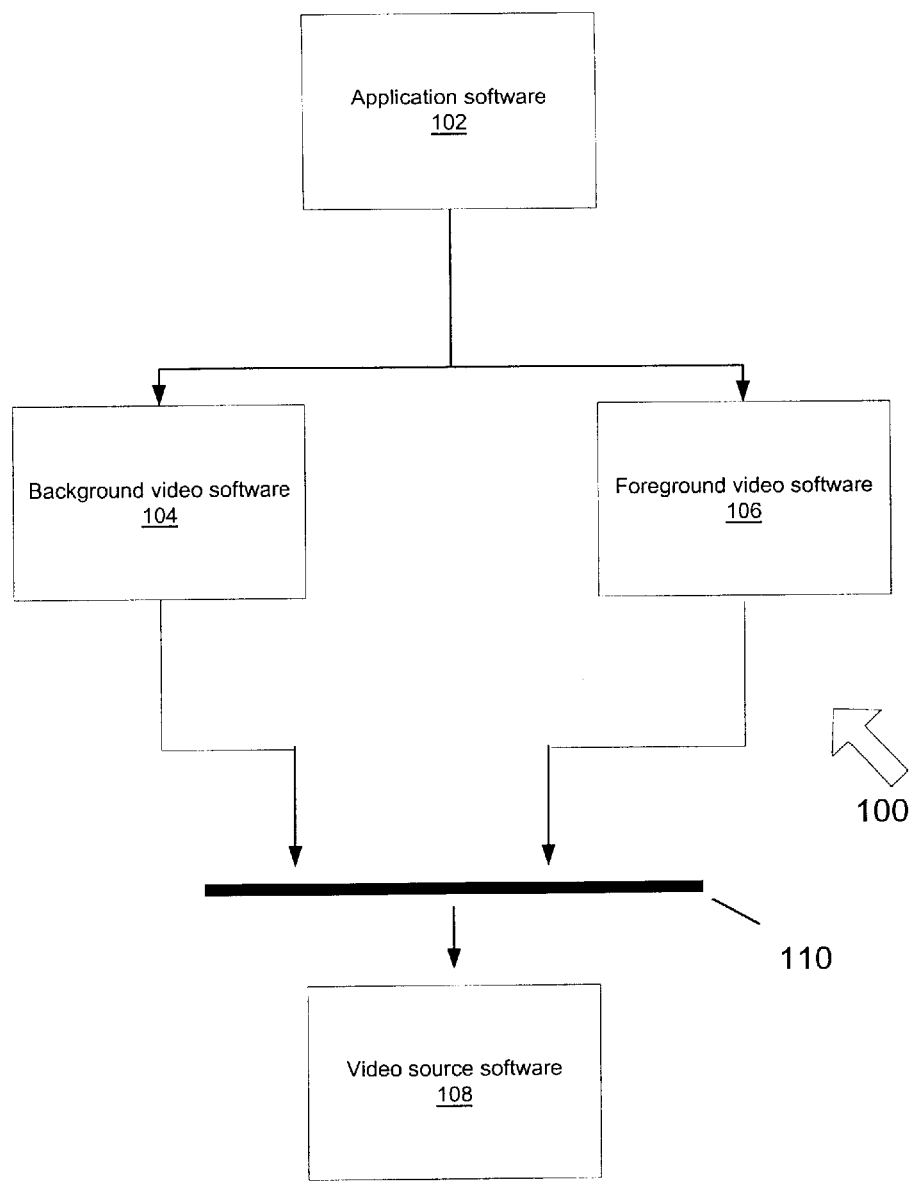
FIG. 1 shows a software arrangement in accordance with the present invention.

FIG. 1 shows a software embodiment 100 in accordance with the present invention. Application software 102 is communicatively coupled with background video software 104 and foreground video software 106. Background video software 104 and foreground video software 106 are further communicatively coupled to video source software 108 by way of software interface 110. Application software 102 provides areas of a display in which to display video information in a computer system. For example, application software 102 may provide windows in which video information may be displayed. Application software 102 may comprise any type of organization of software instructions, including executable programs, libraries, objects, applets, and so on.

Background video software 104 provides functionality to enable application software 102 to display background video. Foreground video software 106 provides functionality to enable application software 102 to display foreground video. Video source software 108 may receive and display video information, according to the direction of background video software 104 and foreground video software 106 via interface 110. For example, video source software 108 may receive a video broadcast signal via video hardware comprised by the computer system. The broadcast may be received via a network (such as the Internet) or via satellite, to name just a few possibilities. Video source software 108 may cooperate with video display hardware and software to display the received video signal. Of course, the invention is not limited to broadcasts, and video signals targeted to particular receivers (unicasts, etc.) are also contemplated.

In an embodiment, background video software 104 and foreground video software 106 may operate independently of one another so that if one is not present or enabled the other may continue to operate. In an embodiment video source software 108 may create a window corresponding to an area of the display in which to display background video on behalf of background video software 104 and/or foreground video software 106.

In an embodiment, application software 102 loads (makes available for execution by a processor) background video software 104 at a time when application software 102 is loaded. Loading background video software 104 may result in initialization and configuration of background video software 104 in preparation for execution. Background video software 104, upon being loaded, loads video source software 108, which in turn may result in initialization and configuration of video source software 108 in preparation for execution. This may result in performance improvements when the time comes to display background video, because at that time latencies associated with loading and initializing background video software 104 and video source software 108 may be reduced. Further, performance improvements may be realized when the time comes to display foreground video, because at that time latencies associated with loading and initializing video source software 108 may be reduced. In an embodiment, application software 102 loads foreground video software 106 at a time when foreground video is to be displayed, and unloads foreground video software 106 upon conclusion of display of video. This may reduce demands on the memory of the computer system performing the video display.

Figure 2:
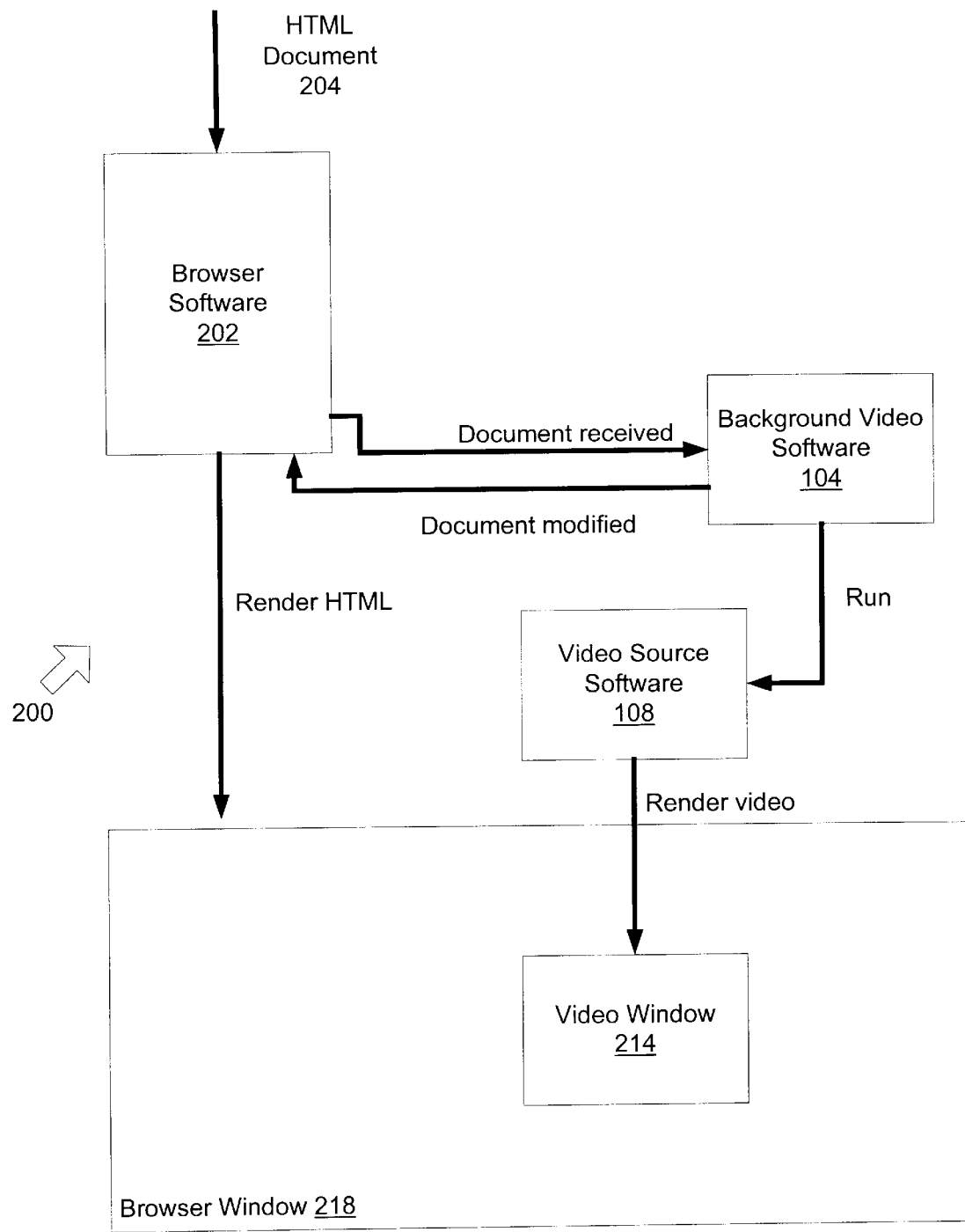
FIG. 2 shows a method embodiment in accordance with the present invention.

FIG. 2 shows a method embodiment 200 in accordance with the present invention. An Hypertext Markup Language (HTML) document 204 is received by browser software 202. Browser software 202 may operate to receive files from a network, such as the Internet, and display a representation of those files. An example of files which browser software 202 may receive are Hypertext Markup Language (HTML) files. In one embodiment, the HTML document 204 comprises a tag identifying a TV "scheme" (also referred to as a TV protocol) for display of background video, such as:

For HTML version 3.2,
<BODY background="tv:">
</BODY>
and for HTML version 4.0,
<BODY style="background: url(tv:)">
</BODY>

For display of foreground video, the tag may comprise the syntax
<OBJECT data="tv:" . . . >

In one embodiment the source of the video to render for a TV scheme is pre-configured, such that it is not necessary to identify a domain name, path, or filename in the tag. Of course, other embodiments could fully or partially specify the video source in the tag by way of a Uniform Resource Locator or other means.

The tag may apply to the background of the entire document 204 or to an element of the document 204 such as a cell in a table or a frame. Of course the syntax of tags for HTML documents may vary from the example provided for tables and frames, and for different versions of HTML. Browser 202 may be configured to communicate with background video software 104 when document 204 is received. Software 104 may be referred to as a "scheme handler", "protocol handler", or more specifically, a "TV scheme handler". Manners of creating and configuring scheme handlers for browsers, such as the Microsoft Internet Explorer™ or the Netscape™ Navigator™ are well known in the art. Software 104 may modify the document 204 so that a solid color, known as the chroma-key color, may be applied to video window 214. Software 104 may determine the chroma-key color by communicating with video source software 108. Video window 214 comprises an area of browser window 218 over which background video is to be rendered. Software 104 may communicate with browser software 202 an indication that the document 204 has been modified. In response, browser software 202 may render a visual representation of the document 204 within browser window 218 on a display of a computer system.

Video window 214 comprises an area of the display where background video is to be rendered. Video window 214 comprises some or all of browser window 218. The chroma-color may be applied across all of the region of browser window 218 comprised by video window 214. Note that browser window 218 and video window 214 are separate windows, that is, they are treated as separate display areas for purposes of managing the windowed display. For example, in a computer system running Microsoft Windows 2000™, browser window 218 and video window 214 comprise separate "logical windows" each with their own window handle, in manners well known in the art.

In one embodiment, background video software 104 may be configured as browser helper software, which is software configured to operate in conjunction with browser software 202. Upon the occurrence of certain events (such as the completion of receiving an HTML file), browser software 202 may communicate with browser helper software. Manners of creating and configuring browser helper software for popular commercial browsers are well known in the art.

Background video software 104 may communicate to the video source software 108 an indication of the location and extent of the video window. For example, in a Microsoft Windows environment a function call resembling the following might be used to start video rendering:

RunVideo(HWND hWindow, RECT *tvWindowExtent, BOOL bMode);

The symbol hWindow is a software variable representing browser window 218. The variable tvWindowExtent describes a rectangular area of browser window 218 where video is to be displayed. Video source software 108 may display video in video window 214 which corresponds in extent with tvWindowExtent. The variable bMode may be set to a value to indicate whether the video is to be displayed in the foreground or the background. When RunVideo is invoked by background video software 104, bMode may be set to indicate background video. When invoked by foreground video software 106, bMode may be set to indicate foreground video.

While embodiment 200 describes HTML documents and browser software, the invention is not limited to this specific application. The invention may operate with any type of document and any software with a window over which background video is to be rendered.

Figure 3:
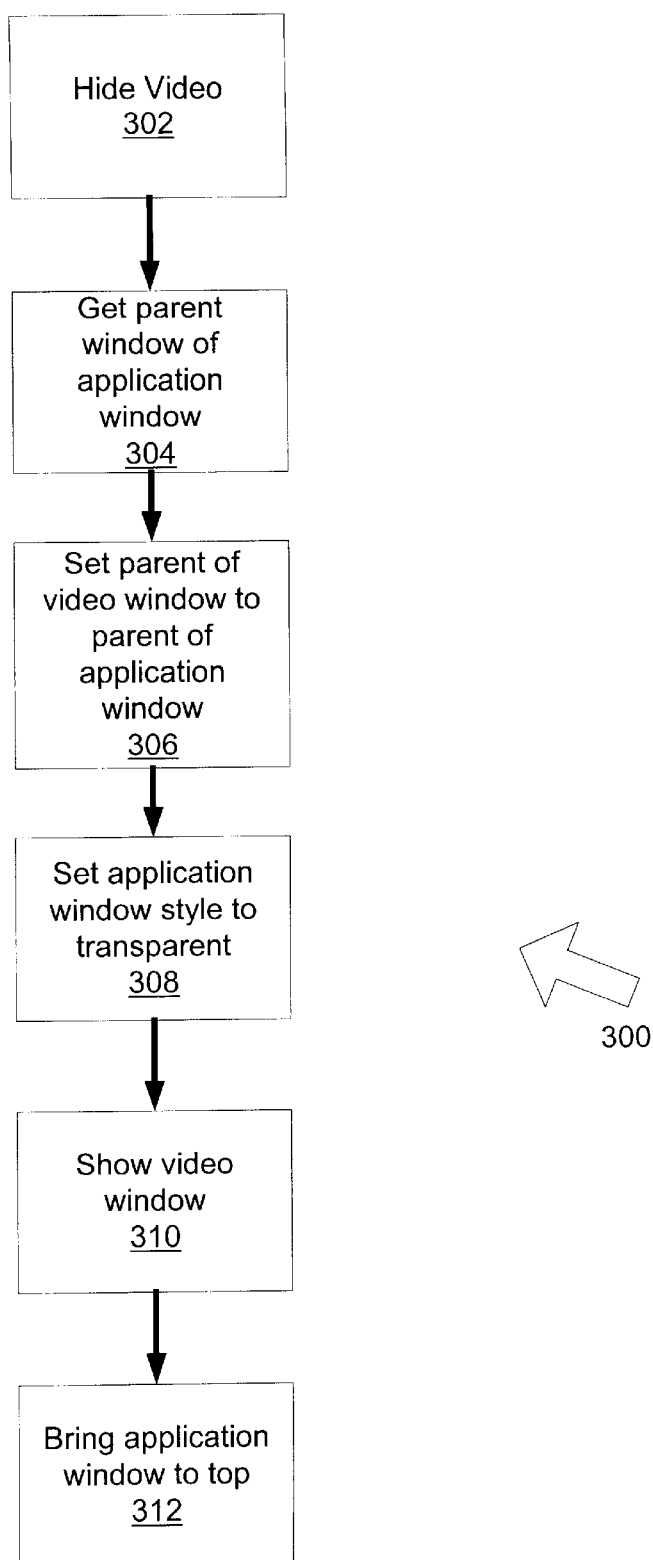
FIG. 3 shows a method embodiment in accordance with the present invention.

FIG. 3 shows a method embodiment 300 to display background video in accordance with the present invention. Embodiment 300 operates to render video in the background of a window in a windowed software environment. Three windows may be involved; a video window, an application window, and a parent window of the application window. A parent window is a window whose position on a display device has a controlling effect on the position of child windows of the parent. Child windows are windows which have the parent window as a parent.

At 302 the video window is hidden, that is, removed from the display. Video window is the window into which the video is rendered. At 304 a parent window of the application window is retrieved. In embodiment 300 the application window is a window associated with an application program, that is, some program that performs a task under the direction of a human user. Of course, the invention is in no way limited to application programs and in general applies to any software which uses windows including Java applets, component object model (COM) software, software libraries, and so on. Parent window of the video window is set to the parent window of the application window at is 306. In other words, the video window is set to be a child of the same window that the application window is a child of. The parent window determines the position of child windows on the display. Whenever the parent window is moved, child windows are moved correspondingly. Setting the application window and the video window with a common parent results in the relative position of the application window and video window being maintained when one or the other is moved.

Other embodiments might not employ a common parent window for both the application and video windows. Other mechanisms may be employed to coordinate displacement of the video and application windows, so long as such mechanisms do not interfere with the order in which the windows are drawn, as described below.

At 308, the application window style is set to "transparent". Transparent style does not necessarily mean that the elements of the window, or the window itself, becomes invisible or hidden from view. Rather a "transparent" style indicates that when the application window is one of a set of child windows (e.g. siblings) on the display, the application window along with its elements are drawn last. In other words, the elements of the application window are always drawn on top of any other sibling windows with which they share an area of the display. In order for the video to render upon the background of the application window, the video window and application window overlap to some extent. The application window has a style of transparent and thus draws after the video window draws whenever the portion of the display containing the application window and video window, or a portion of them, is "invalidated". This may occur, for example, when the application and video windows are moved or when they are occluded or partially occluded by another window and later un-occluded. In an embodiment, the transparent style may be set by video source software 108 in response to the bMode variable having a value which indicates background video display.

To understand the effect of setting the application window style to transparent, it is helpful to examine how video is rendered in embodiment 300. A video window is established to receive the rendered video. The video window corresponds to a rectangular area of the display (other embodiments might support non-rectangular displays). This rectangular area comprises a collection of pixels, e.g. points on the display which may be illuminated with color. The pixels of the video window are first set to the chroma key color. During video rendering, each pixel within the extent of the video window region which has the chroma key color is set to the color of the video in that position. When a pixel is encountered which is not the chroma key color, that pixel is skipped and not set to the video color. The application window or a portion thereof has a background which is also set to the chroma key color. Elements of the application window which overlap the video window and which are not set to the chroma key color are not overwritten with video. For example, there may be buttons, icons, text, or other elements which are black in color, whereas the chroma key color may be cyan or magenta. These display elements will appear in the "foreground" whereas the video appears in the "background", because the video will not replace the pixels of these elements.

When a display area comprising the video and application windows or a portion thereof is invalidated, the video window or portion thereof is drawn first. In one embodiment, drawing the video window involves first setting pixels in the invalidated region with the chroma key color, and then rendering the video by setting each chroma key colored pixel to the color of the video at that pixel location. Drawing the application window involves setting each background pixel in the invalidated area to the chroma key color, and then drawing elements of the application window over this background. Thus, in one embodiment at least some pixels of the video window may be set to the chroma key color twice. Any chroma key colored pixels in the invalidated region are replaced with video.

Consequently, elements of the application window which are not the chroma key color are drawn last and are not replaced with video. Video thus appears to render in the background of the application window and does not obscure the elements of the application window.

At 310 the video window is shown, that is, made visible on the display. At 312 the application window is brought to the "top" of any set of overlapping windows. In embodiment 300, bringing the application window to the top is a mechanism to make the application window responsive to user input activities such as mouse clicks and keyboard button presses. Other embodiments may of course employ other techniques to make the application window responsive.

Figure 4:
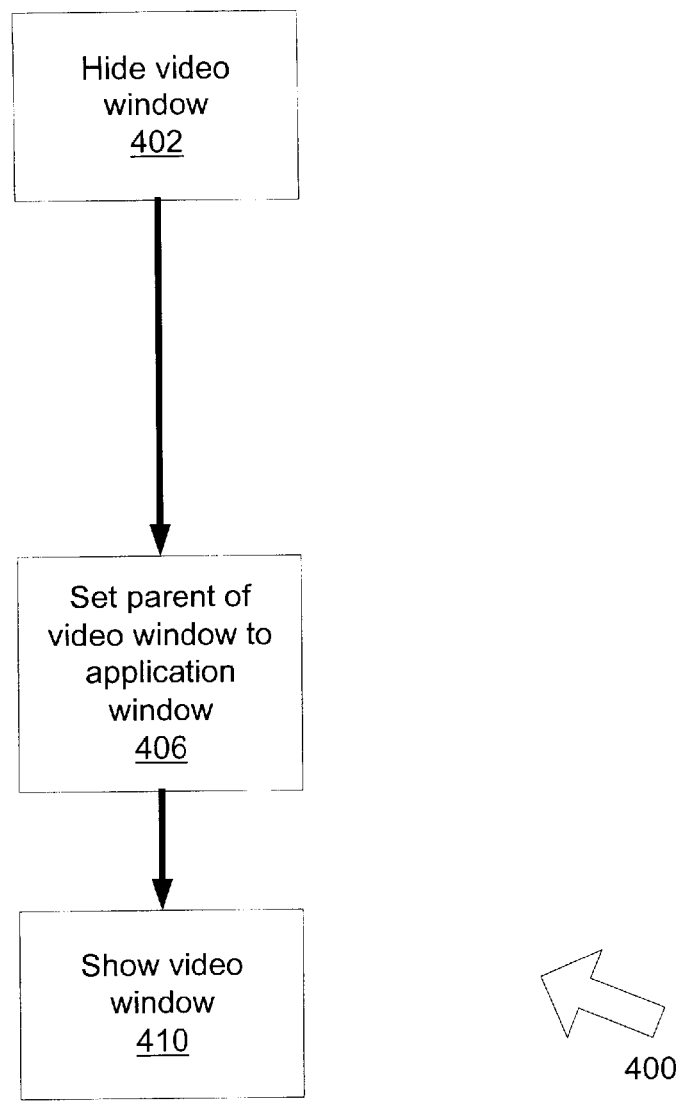
FIG. 4 shows a method embodiment in accordance with the present invention.

FIG. 4 shows an embodiment 400 of a method to display foreground video in accordance with the present invention. At 402 the video window is hidden, that is, made not visible on the display. At 406 the parent of the video window is set to the application window (e.g. the video window is made a child of the application window). Alternatively, the parent of the video window could be set to a child window of the application window. In either case, the video window may move relative to the application window because the video window is a child (or grandchild) of the application window. The video window is shown (e.g. made visible on the display) at 410. Note that the application window style was not set to transparent as it was for background video display. If the application window style was already set to transparent, this setting may be removed before the window is shown. Note also that the application window was not brought to the top—with foreground video display, no display elements of the application window are displayed over the video window.

Figure 5:
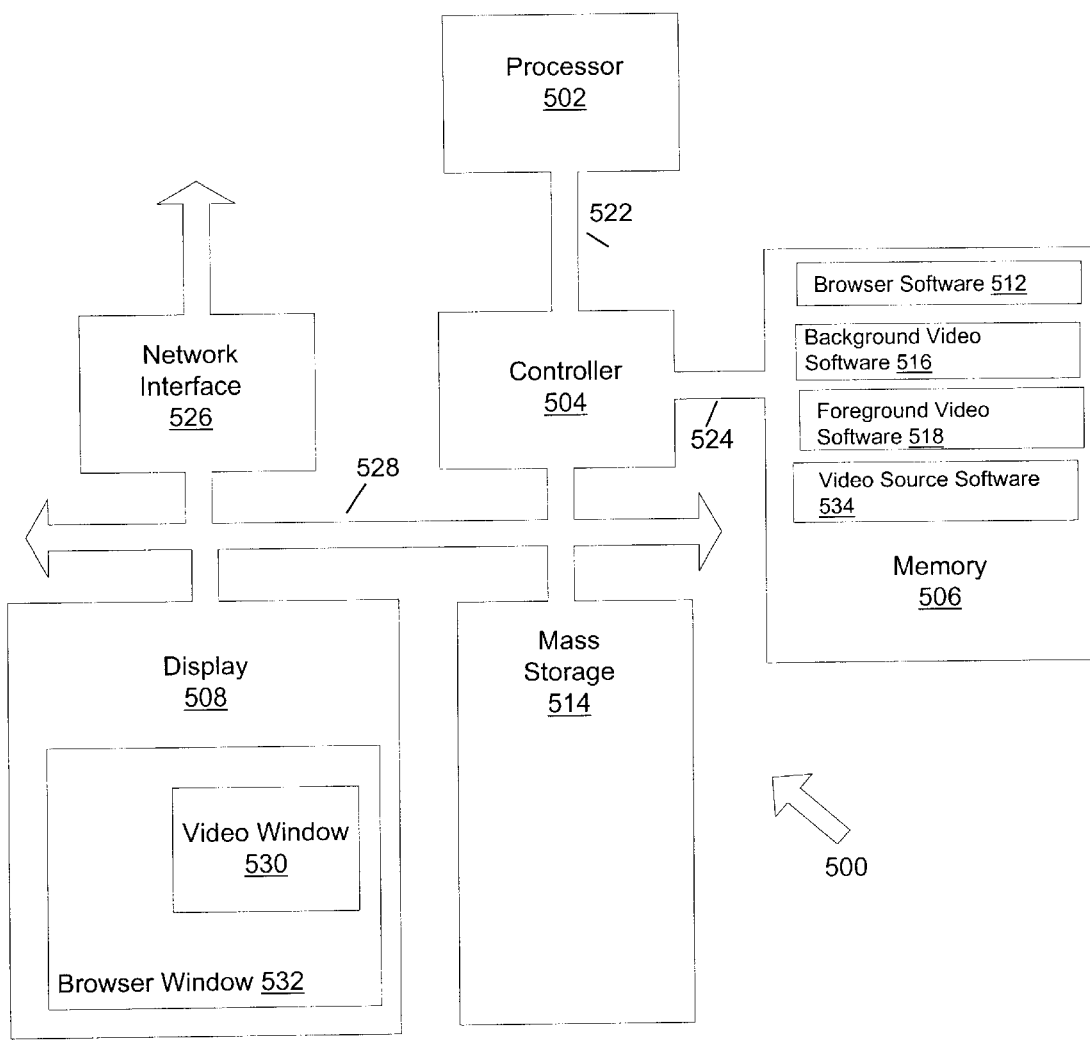
FIG. 5 shows a computer system in accordance with the present invention.

FIG. 5 shows a computer system embodiment 500 in accordance with the present invention. Embodiment 500 comprises a processor 502 coupled to a controller 504 by way of a processor bus 522, commonly referred to as a front side bus. Bus controller 504 is coupled to memory 506 via memory bus 524. Bus controller 504 is also coupled to various peripheral devices such as mass storage 514, network interface 526, and display 508 via I/O bus 528. Network interface 526 provides apparatus 500 with access to networks such as the Internet or corporate intranets.

Memory 506 stores browser software 512, background video software 316, foreground video software 518, and video source software 534. Memory 506 is typically a form of random access memory (RAM), although in some embodiments memory 506 could comprise non-volatile memory such as a hard disk, flash memory, or CD ROM. Memory 506 supplies the instructions of software stored therein to processor 502 for execution. Of course, mass storage 514 may store archived versions of browser software 512, background video software 516, foreground video software 518, and video source software 534.

Execution of browser software 512, video source software 524, and/or background video software 516 and foreground video software 518 by processor 502 may result in display of browser window 532, and background and/or foreground video in video window 530 on display device 508.

Figure 6:
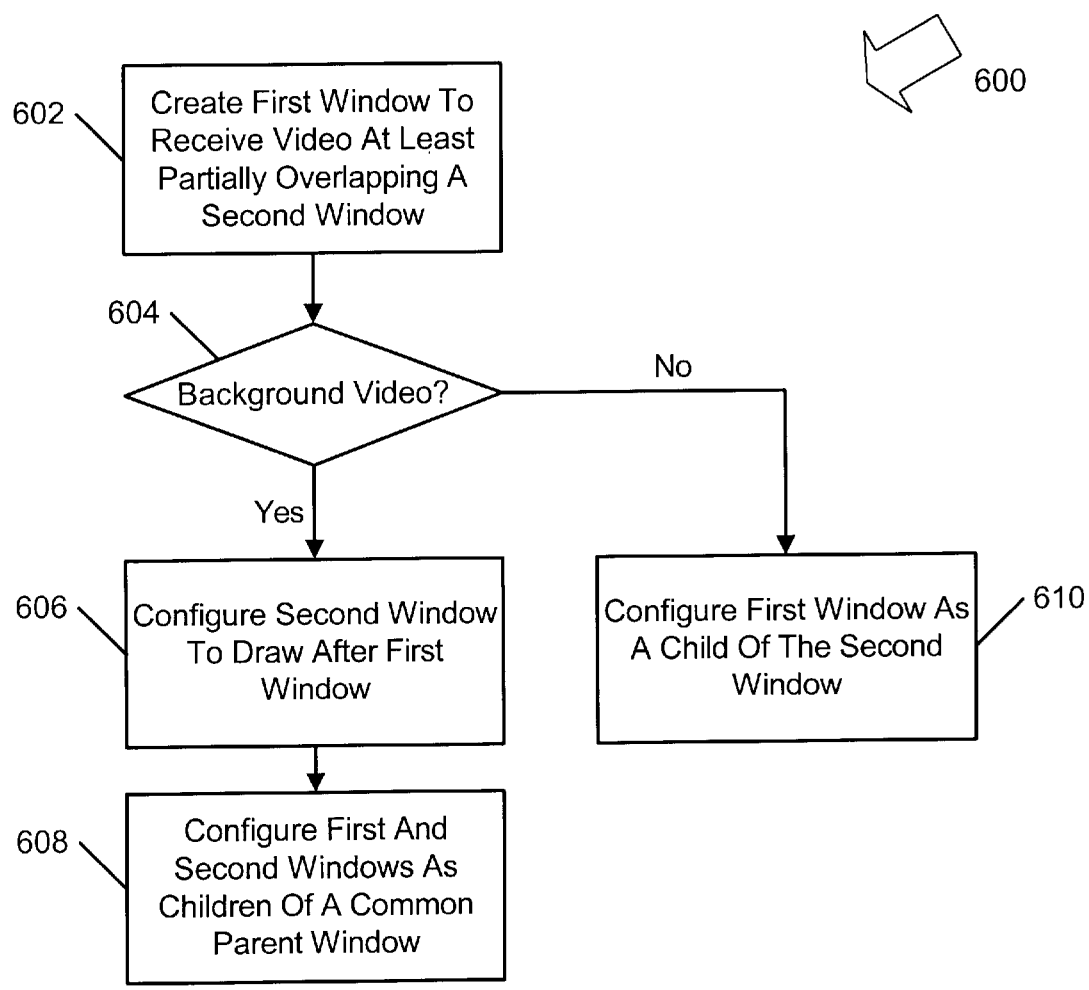
FIG. 6 shows a method embodiment in accordance with one embodiment of the present invention.

FIG. 6 shows a method 600 embodiment in accordance with one embodiment of the present invention.

At 602, a first window is created to receive video, where the first window at least partially overlaps a second window. As discussed above with respect to FIGS. 3 and 4, the video may be displayed in the background, and various relationships determined between the video window and other windows. In the illustrated embodiment, a test is performed 604 to determine whether the video is to be displayed in the background. When the video is to be displayed in the background, in the illustrated embodiment, the second window is configured 606 to draw after the first window, and the first and second windows are configured 608 as children of a common parent window. Otherwise, when the video is not to be displayed in the background, in the illustrated embodiment, the first window is configured 610 as a child of the second window.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:

creating a first window to receive video which at least partially overlaps a second window on a region of overlap of a display;

when the video is to be displayed in the background,
configuring the second window to draw after the first window; and
configuring the first and second windows as children of a common parent window;

when the video is not to be displayed in the background, configuring the first window as a child of the second window.

2. The method of claim 1 further comprising:

setting the pixels of the first window to a chroma color; and setting background pixels of the second window in the region of overlap to the chroma color.

3. The method of claim 1 further comprising:

when the video is to be displayed in the background, configuring the second window to receive user interface events.

4. The method of claim 1 in which configuring the second window to draw after the first window further comprises:

setting the style of the second window to transparent.

5. A method comprising:

creating a first window which at least partially overlaps a second window in a region of overlap on a display;

configuring the first and second windows to move correspondingly to one another;

when the video is to be displayed in the background,
configuring the first and second windows such that the region of overlap is always drawn first with a chroma color and then drawn with other colors representing window elements; and
configuring the second window to receive user interface events;

when the video is not to be displayed in the background, drawing the region of overlap with the chroma color.

6. The method of claim 5 further comprising:

rendering video only to areas of the region of overlap which have the chroma color.

7. The method of claim 5 in which configuring the first and second windows such that the region of overlap is always drawn first with a chroma color further comprises:

setting the style of the second window to transparent.

8. An article comprising:

a machine-readable medium comprising instructions which, when executed by a processor, result in:

creating a first window to receive video which at least partially overlaps a second window on a region of overlap of a display;

when the video is to be displayed in the background,
configuring the second window to draw after the first window; and
configuring the first and second windows as children of a common parent window;

when the video is not to be displayed in the background, configuring the first window as a child of the second window.

9. The article of claim 8 in which the instructions, when executed by the processor, further result in:

setting the pixels of the first window to a chroma color; and setting background pixels of the second window in the region of overlap to the chroma color.

10. The article of claim 8 in which the instructions, when executed by the processor, further result in:

when the video is to be displayed in the background, configuring the second window to receive user interface events.

11. The article of claim 8 in which in which the instructions, when executed by the processor, to configure the second window to draw after the first window, further result in:

setting the style of the second window to transparent.

12. A system comprising:

a processor; and a machine-readable medium coupled to the processor and comprising instructions which, when executed by a processor, result in:

creating a first window to receive video which at least partially overlaps a second window on a region of overlap of a display;

when the video is to be displayed in the background,
configuring the second window to draw after the first window; and
configuring the first and second windows as children of a common parent window;

when the video is not to be displayed in the background,
configuring the first window as a child of the second window.

13. The system of claim 12 in which the instructions, when executed by the processor, further result in:

setting the pixels of the first window to a chroma color; and setting background pixels of the second window in the region of overlap to the chroma color.

14. The system of claim 12 in which the instructions, when executed by the processor, further result in:

when the video is to be displayed in the background, configuring the second window to receive user interface events.

15. The system of claim 12 in which the instructions, when executed by the processor, to configure the second window to draw after the first window, further result in:

setting the style of the second window to transparent.

* * * * *

UNITED STATES PATENT AND TRADEMARK OFFICE
CERTIFICATE OF CORRECTION

PATENT NO. : 6,636,245 B1
DATED : October 21, 2003
INVENTOR(S) : Estipona

It is certified that error appears in the above-identified patent and that said Letters Patent is hereby corrected as shown below:

<u>Column 4,</u>
Line 44, after "window at", delete "is".

Signed and Sealed this

Sixth Day of April, 2004

JON W. DUDAS
*Acting Director of the United States Patent and Trademark Office*